(12) United States Patent
Bessonoff et al.

(10) Patent No.: US 11,207,803 B2
(45) Date of Patent: Dec. 28, 2021

(54) METHOD FOR PREPARING A MEMBRANE FROM FIBRIL CELLULOSE AND FIBRIL, CELLULOSE MEMBRANE

(71) Applicant: UPM-KYMMENE CORPORATION, Helsinki (FI)

(72) Inventors: Marko Bessonoff, Helsinki (FI); Jouni Paltakari, Espoo (FI); Antti Laukkanen, Helsinki (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 1163 days.

(21) Appl. No.: 14/394,638

(22) PCT Filed: May 14, 2013

(86) PCT No.: PCT/FI2013/050523
§ 371 (c)(1),
(2) Date: Oct. 15, 2014

(87) PCT Pub. No.: WO2013/171373
PCT Pub. Date: Nov. 21, 2013

(65) Prior Publication Data
US 2015/0068973 A1    Mar. 12, 2015

(30) Foreign Application Priority Data
May 14, 2012 (FI) ...................................... 20125515

(51) Int. Cl.
*B29C 35/02* (2006.01)
*B01D 71/10* (2006.01)
(Continued)

(52) U.S. Cl.
CPC ...... *B29C 35/0277* (2013.01); *B01D 39/1692* (2013.01); *B01D 39/18* (2013.01);
(Continued)

(58) Field of Classification Search
CPC ............... B01D 2323/42; B01D 39/18; B01D 67/0095; B01D 71/10; B01D 2325/14;
(Continued)

(56) References Cited

U.S. PATENT DOCUMENTS 399,064 A * 3/1889 Mclean ..................... D21J 7/00
                                                   249/113
4,121,968 A * 10/1978 Wells ....................... D21C 9/06
                                                   162/290
(Continued)

FOREIGN PATENT DOCUMENTS

CA    2 782 485          5/2012
DE    196 27 891 A1      1/1998
(Continued)

OTHER PUBLICATIONS

Nov. 10, 2015 Search Report issued in Finnish Patent Application No. 20125515.
(Continued)

*Primary Examiner* — Ana M Fortuna
(74) *Attorney, Agent, or Firm* — Nixon Peabody LLP

(57) ABSTRACT

Method for preparing a membrane from fibril cellulose includes supplying fibril cellulose dispersion on a filter layer, draining liquid from a fibril cellulose dispersion by the effect of reduced pressure through the filter layer that is impermeable to fibrils of the fibril cellulose but permeable to the liquid to form a membrane sheet on the filter fabric, applying heat on the opposite side of the membrane sheet to the membrane sheet while continuing draining of the liquid through the filter layer by pressure difference over the filter layer, and removing the membrane sheet from the filter layer as a freestanding membrane.

29 Claims, 10 Drawing Sheets

(51) Int. Cl.
| | |
|---|---|
| B01D 67/00 | (2006.01) |
| B01D 39/18 | (2006.01) |
| F26B 7/00 | (2006.01) |
| F26B 13/28 | (2006.01) |
| B01D 39/16 | (2006.01) |
| B29K 1/00 | (2006.01) |
| B29L 9/00 | (2006.01) |
| D21F 9/00 | (2006.01) |
| D21F 11/14 | (2006.01) |
| F26B 5/14 | (2006.01) |

(52) U.S. Cl.
CPC ..... *B01D 67/0004* (2013.01); *B01D 67/0095* (2013.01); *B01D 71/10* (2013.01); *D21F 9/00* (2013.01); *D21F 9/003* (2013.01); *D21F 11/14* (2013.01); *F26B 5/14* (2013.01); *F26B 7/00* (2013.01); *F26B 13/28* (2013.01); *B01D 2239/0654* (2013.01); *B01D 2323/42* (2013.01); *B01D 2325/14* (2013.01); *B29C 2035/0283* (2013.01); *B29K 2001/00* (2013.01); *B29L 2009/00* (2013.01)

(58) Field of Classification Search
CPC .... D21F 11/14; D21F 9/00; F26B 7/00; F26B 13/28; B29C 2035/0283; B29K 2001/00; B29L 2009/00
See application file for complete search history.

(56) References Cited

U.S. PATENT DOCUMENTS

| | | | | |
|---|---|---|---|---|
| 4,288,462 | A * | 9/1981 | Hou | A23L 2/72 210/777 |
| 4,973,384 | A * | 11/1990 | Crouse | D21F 3/0218 162/358.5 |
| 5,156,856 | A * | 10/1992 | Iwasaki | B28B 1/265 249/113 |
| 5,660,863 | A * | 8/1997 | Nakano | B28B 3/02 425/420 |
| 6,013,215 | A * | 1/2000 | Iwamoto | B28B 7/46 249/141 |
| 6,267,252 | B1 * | 7/2001 | Amsler | B01D 39/163 210/483 |
| 6,350,349 | B1 * | 2/2002 | Hermans | D21F 11/14 162/111 |
| 9,499,637 | B2 * | 11/2016 | Retsina | C08B 15/04 |
| 10,435,842 | B2 * | 10/2019 | Heiskanen | D21H 17/26 |
| 10,626,191 | B2 * | 4/2020 | Nuopponen | C08L 1/02 |
| 2005/0026526 | A1 * | 2/2005 | Verdegan | B01D 39/16 442/340 |
| 2006/0137318 | A1 * | 6/2006 | Lim | B01D 39/1615 55/528 |
| 2010/0190020 | A1 * | 7/2010 | Frederiksen | B32B 27/06 428/507 |
| 2012/0298319 | A1 * | 11/2012 | Fujiwara | B01D 67/0004 162/100 |
| 2015/0045549 | A1 * | 2/2015 | Laukkanen | D21H 11/18 536/85 |
| 2015/0121793 | A1 * | 5/2015 | Segaert | B32B 27/304 52/506.01 |
| 2021/0130500 | A1 * | 5/2021 | Vuorinen | C12N 1/22 |

FOREIGN PATENT DOCUMENTS

| | | |
|---|---|---|
| DE | 19627891 | 1/1998 |
| DE | 10 2008 002 655 A1 | 12/2009 |
| EP | 1 469 126 A1 | 10/2004 |
| JP | 8-302597 | 11/1996 |
| JP | 11-300114 | 11/1999 |
| JP | 11-323764 | 11/1999 |
| JP | 2002-227087 | 8/2002 |
| JP | 2003-301395 | 10/2003 |
| JP | 2007-46196 | 2/2007 |
| JP | 2010-168716 A | 8/2010 |
| JP | 2011-202010 | 10/2011 |
| WO | 2011/013567 | 2/2011 |
| WO | 2011/068023 | 6/2011 |
| WO | 2011/093510 | 8/2011 |
| WO | WO 2011/093510 A1 | 8/2011 |
| WO | WO 2012/056109 A2 | 5/2012 |

OTHER PUBLICATIONS

Syverud et al., "Strength and barrier properties of MFC films," *Cellulose*, 2009, vol. 16, pp. 75-85.
Chinga-Carrasco et al., "Computer-assisted quantification of the multi-scale structure of films made of nanofibrillated cellulose," *J Nanopart Res*, 2010, vol. 12, pp. 841-851.
Liu et al., "Clay Nanopaper with Tough Cellulose Nanofiber Matrix for Fire Retardancy and Gas Barrier Functions," *Biomacromolecules*, 2011, vol. 12, pp. 633-641.
Mar. 14, 2013 Finnish Office Action issued in Finnish Application No. 20125515.
Nov. 13, 2013 Written Opinion issued in International Application No. PCT/FI2013/050523.
Nov. 13, 2013 International Search Report issued in International Application No. PCT/FI2013/050523.
Oct. 6, 2014 International Preliminary Report on Patentability issued in International Application No. PCT/FI2013/050523.
May 20, 2014 Written Opinion issued in International Application No. PCT/FI2013/050523.
Office Action dated May 23, 2017 in Japanese patent application No. 2015-512093.
Office Action from related Japanese Patent Application No. 2015-512093 dated Jan. 30, 2018.

* cited by examiner

METHOD FOR PREPARING A MEMBRANE FROM FIBRIL CELLULOSE AND FIBRIL, CELLULOSE MEMBRANE

FIELD OF THE INVENTION

The present invention relates to a method for preparing a membrane from fibril cellulose. The invention also relates to a fibril cellulose membrane.

BACKGROUND OF THE INVENTION

Fibril cellulose refers to isolated cellulose microfibrils or microfibril bundles derived from cellulose raw material. Fibril cellulose, which is also known as nanofibrillar cellulose (NFC) and by other related names, is based on a natural polymer that is abundant in nature. Fibril cellulose has many potential uses for example based on its capability of forming viscous gel in water (hydrogel).

Fibril cellulose production techniques are based on grinding (or homogenization) of aqueous dispersion of pulp fibers. The concentration of fibril cellulose in dispersions is typically very low, usually around 1-5%. After the grinding or homogenization process, the obtained fibril cellulose material is a dilute viscoelastic hydrogel.

There is also interest in making structural products from fibril cellulose by removing water to the extent that the product exists as a self-supporting structure in form of a membrane, which could be used in several applications, for example in those requiring biodegradability.

Strong water retention is typical for fibril cellulose since water is bound to the fibrils through numerous hydrogen bonds. Consequently, reaching a dry matter content of a membrane requires a long drying time. Conventional methods such as vacuum filtration can involve several hours. Low consistency of the fibril cellulose dispersion favors the formation of thin membranes with small variations in grammage over the surface of the membrane. On the other hand this will increase the amount of water that has to be removed during drying.

With some fibril cellulose grades, such as fibril cellulose containing anionically charged groups (anionically charged fibril cellulose), the higher viscosity is an additional problem that causes longer dewatering times. Such anionically charged fibril cellulose can be for example chemically modified cellulose that contains carboxyl groups as a result of the modification. Cellulose obtained through N-oxyl mediated catalytic oxidation (e.g. through 2,2,6,6-tetramethyl-1-piperidine N-oxide) or carboxymethylated cellulose are examples of anionically charged fibril cellulose where the anionic charge is due to a dissociated carboxylic acid moiety.

The problem in mechanical water removal at slow rate is assumed to be the ability of fibril cellulose hydrogel to form a very dense and impermeable nanoscale membrane around itself, for example during filtration. The formed shell prevents diffusion of water from the gel structure, which leads to very slow concentration rates. The same applies to evaporation where the skin formation blocks the evaporation of water.

Due to the properties of the fibril cellulose hydrogels, either of native (chemically non-modified) or chemically modified cellulose, formation of membranes of uniform structure in short times that are suitable to industrial production is very challenging.

SUMMARY OF THE INVENTION

It is a purpose of the invention to provide a novel method for drying fibril cellulose of relatively low consistency to a dry matter level where it can be used as a membrane. It is a further purpose of the invention to enable the production of fibril cellulose membrane in a time that is feasible in view of industrial production.

In the method, a membrane is prepared starting from a fibril cellulose dispersion in liquid medium by first draining the liquid by the effect of reduced pressure through a filter fabric impermeable to fibrils of the fibril cellulose but permeable to the liquid to form a membrane sheet on the filter fabric, whereafter heat is applied on the opposite side of the membrane sheet while continuing draining of the liquid through the filter fabric by pressure difference over the filter fabric. When the membrane sheet has attained a desired dry matter content it is removed from the filter fabric as a freestanding membrane which can be treated further or stored.

The heat applied on the opposite side of the membrane sheet being formed through draining can be accomplished by contact (conduction) with a heated surface or by irradiation of the surface of the membrane sheet (radiation heat). At the same time, the water is drained through pressure difference that exists on the opposite sides of the filter fabric. This can be accomplished by reduced pressure or pressing mechanically the membrane sheet with the heated surface.

The heat is applied to the membrane sheet being formed to raise its temperature to the range which is below the boiling point of the liquid to promote the removal of the liquid in liquid state.

If the pressure difference is achieved by pressing the membrane sheet with the heated surface against the filter fabric, and the final draining of the liquid out of the membrane sheet can be enhanced by placing an absorbent sheet against the free side of the filter fabric where it can receive the liquid issuing through the fabric. Absorbent pulp sheets, blotting papers or drying felts that can receive water can be used. Such sheets can be placed in layers against the free side of the filter fabric. Such an absorbent sheet or plurality of sheets remove liquid by absorption from the membrane sheet being formed.

The drying time (time to reach the desired target dry matter content of the membrane sheet) can be reduced considerably.

Some grades of the fibril cellulose are especially hard to dry because of their water retention capacity and the drying may take considerably longer than with normal "native" grades. Fibril cellulose containing anionically charged groups are one example of fibril cellulose dispersions that are particularly difficult. Cellulose obtained through N-oxyl mediated catalytic oxidation (e.g. through 2,2,6,6-tetramethyl-1-piperidine N-oxide) or carboxymethylated cellulose are specific examples of anionically charged fibril cellulose where the anionic charge is due to a dissociated carboxylic acid moiety. These anionically charged fibril cellulose grades are potential starting materials for the preparation of membranes, because high quality fibril cellulose dispersions are easy to manufacture from the chemically modified pulp. The anionically charged fibril cellulose grades can be pretreated by lowering the pH of the dispersion by adding acid. This pretreatment reduces the water retention capacity. For example by lowering the pH of the fibril cellulose dispersion to below 3 the drying time using the above-described methods can be reduced.

If the size of the cellulose fibrils is small, they may flow through the filter fabric together with the liquid to be removed even at the smallest possible hole size of the filter fabric. According to one embodiment of the method, the cellulose fibrils are kept separated from the filtrate liquid by applying a first fibril cellulose dispersion on the filter fabric and forming a fibril network through draining of the liquid through the filter fabric that is impermeable to the fibrils of the first fibril cellulose dispersion. This fibril network acts as a kind of auxiliary filter for the second fibril cellulose dispersion applied subsequently where the size of the fibrils is smaller than in the first fibril cellulose dispersion. After the application of the second fibril cellulose dispersion the draining proceeds as with a fibril cellulose dispersion applied in one step.

The size of the fibrils of the second fibril cellulose dispersion is such that compared with the hole size of the filter fabric they would penetrate through the fabric together with the liquid (filtrate) drained from the dispersion. The quantity of the second fibril cellulose dispersion is larger than the quantity of the first fibril cellulose dispersion and it constitutes the largest part of the weight of the dried membrane.

A filter fabric that has hole size sufficiently small in relation to the particle size (size of the fibrils) can be used so that the fabric divides by its permeability characteristics (cut-off value) the fibril cellulose dispersion in filtrate substantially devoid of fibrils and filtered membrane sheet consisting of cellulose fibrils and possible other solid matter contained in the fibril cellulose dispersion. The hole size of such filter fabrics are in the micrometer range. The filter fabric is made of a material that is non-adherent to the filtered fibril cellulose membrane sheet. Plastics can be used as the material of the filter fabric. Tightly woven polyamide-6,6 fabrics are one example of filter fabrics that can be used. Such polyamide fabrics are available in various hole sizes, which can be selected according to the particle size of the fibril cellulose.

The heated surface for bringing heat into the fibril cellulose is also non-adherent to the filtered fibril cellulose membrane sheet. A metal plate coated with a repellent and heat-resistant coating, for example PTFE, can be used.

The method can be used for manufacturing separate individual membranes successively one by one in a sheet mold by applying the fibril cellulose dispersion on a filter fabric and performing successive work stages according to a predetermined sequence, or for manufacturing continuous membrane in a continuous process by applying the fibril cellulose dispersion on a moving filter fabric which carries the membrane sheet being formed through successive work stages.

The starting concentration of the fibril cellulose dispersion that is applied on the filter fabric is usually not higher than 5%, for example in the range of 0.5-5.0%. This is usually the initial concentration of the fibril cellulose at the exit of the manufacturing process where it is manufactured by disintegrating fibrous raw material. However, it is possible that the fibril cellulose dispersion is diluted with a liquid from the initial concentration (concentration of the product from the manufacturing process) to a suitable starting concentration to ensure that it is distributed evenly on the filter fabric to avoid variations in the membrane structure. Depending on the characteristic viscosity of the fibril cellulose grade, the starting concentration can be lower or higher, and it can vary between 0.1 and 10%. Higher concentrations can be used for low-viscosity grades, which can be spread uniformly on the filter fabric despite the high concentration.

The liquid that is to be drained is usually water, that is, the fibril cellulose is aqueous fibril cellulose where cellulose fibrils are dispersed in water usually at a relatively low concentration, not higher than 5%, for example in the range of 0.5-5.0%, but the starting concentration can vary in a wider range, such as 0.1 to 10%. Likewise the fibril cellulose issues as aqueous fibril cellulose from a manufacturing process where the fibrous starting material suspended in water is disintegrated. Draining of the liquid out of the fibril cellulose dispersion can be called "dewatering" in the case of water.

When water is the liquid to be drained, the heat is applied to the fibril cellulose on the filter fabric preferably at the intensity that raises the temperature of the fibril cellulose at least to 70° C. but below 100° C., for example in the range of 70-95° C. Contrary to what might be expected, raising the temperature above 100° C. does not improve the drying result, because as long as the membrane sheet contains large amounts and water and the water is removed through pressure difference in the initial stages of drying, water must not be allowed to boil, because this will have a detrimental effect on the membrane. When the membrane sheet is dry enough and no further water is extractable from the sheet by pressure difference, the residual water still bound to the finally formed fibril network of the sheet can be removed by evaporation. In this case temperature higher than 100° C. can also be used.

The filter fabric is of the type that does not adhere to the membrane sheet of fibril cellulose. Synthetic polymer materials such as PET, polyamide and fluoropolymers are suitable materials.

However, it is possible that a filtration layer is used that retains the cellulose fibrils while allowing the liquid to pass, in the same purpose as the filter fabric, but will remain adhered to the membrane sheet and will form part of the membrane product. In this case the filtration layer can be made of a material that is adherent to the cellulose fibrils of the membrane sheet, and it can be for example made of cellulose fibers.

Auxiliary agents for enhancing the manufacturing process or improving or adjusting the properties of the membrane can be included in the fibril cellulose dispersion. Such auxiliary agents can be soluble in the liquid phase of the dispersion or solid. Auxiliary agents can be added already during the manufacturing of the fibril cellulose dispersion to the raw material or added to a fibril cellulose dispersion before applying it on the filter fabric.

BRIEF DESCRIPTION OF THE DRAWINGS

The invention will be explained in the following with reference to the appended drawings, where.

DETAILED DESCRIPTION OF THE INVENTION

Figure 1:
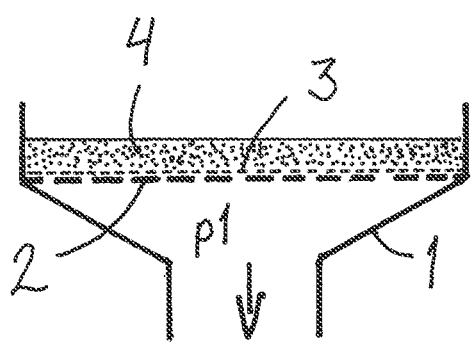
FIGS. 1 and 2 show the method according to one embodiment.

In this specification, percentage values, unless specifically indicated otherwise, are based on weight (wt/wt). If some numerical ranges are given, the ranges include also the upper and lower values given.

Starting Material of the Membrane

The starting material, fibril cellulose, consists of cellulose fibrils whose diameter is in the submicron range. It forms a self-assembled hydrogel network even at low concentrations. These gels of fibril cellulose are highly shear thinning and thixotrophic in nature.

The fibril cellulose is prepared normally from cellulose raw material of plant origin. The raw material can be based on any plant material that contains cellulose. The raw material can also be derived from certain bacterial fermentation processes. Plant material may be wood. Wood can be from softwood tree such as spruce, pine, fir, larch, douglas-fir or hemlock, or from hardwood tree such as birch, aspen, poplar, alder, eucalyptus or acacia, or from a mixture of softwoods and hardwoods. Non-wood material can be from agricultural residues, grasses or other plant substances such as straw, leaves, bark, seeds, hulls, flowers, vegetables or fruits from cotton, corn, wheat, oat, rye, barley, rice, flax, hemp, manila hemp, sisal hemp, jute, ramie, kenaf, bagasse, bamboo or reed. The cellulose raw material could be also derived from cellulose-producing micro-organisms. The micro-organisms can be of the genus *Acetobacter, Agrobacterium, Rhizobium, Pseudomonas* or *Alcaligenes*, preferably of the genus *Acetobacter* and more preferably of the species *Acetobacter xylinum* or *Acetobacter pasteurianus*.

The term "fibril cellulose" refers to a collection of isolated cellulose microfibrils or microfibril bundles derived from cellulose raw material. Microfibrils have typically high aspect ratio: the length might exceed one micrometer while the number-average diameter is typically below 200 nm. The diameter of microfibril bundles can also be larger but generally less than 1 μm. The smallest microfibrils are similar to so called elementary fibrils, which are typically 2-12 nm in diameter. The dimensions of the fibrils or fibril bundles are dependent on raw material and disintegration method. The fibril cellulose may also contain some hemicelluloses; the amount is dependent on the plant source. Mechanical disintegration of fibril cellulose from cellulose raw material, cellulose pulp, or refined pulp is carried out with suitable equipment such as a refiner, grinder, homogenizer, colloider, friction grinder, ultrasound sonicator, fluidizer such as microfluidizer, macrofluidizer or fluidizer-type homogenizer.

The fibril cellulose is preferably made of plant material. One alternative is to obtain the fibrils from non-parenchymal plant material where the fibrils are obtained from secondary cell walls. One abundant source of cellulose fibrils is wood fibres. The nanofibrillated cellulose is manufactured by homogenizing wood-derived fibrous raw material, which may be chemical pulp. The disintegration in some of the above-mentioned equipments produces fibrils which have the diameter of only some nanometers, which is 50 nm at the most and gives a dispersion of fibrils in water. The fibrils can be reduced to size where the diameter of most of the fibrils is in the range of only 2-20 nm only. The fibrils originating in secondary cell walls are essentially crystalline with degree of crystallinity of at least 55%.

The starting material for the membrane preparation process is usually fibril cellulose obtained directly from the disintegration of some of the above-mentioned fibrous raw material and existing at a relatively low concentration homogeneously distributed in water due to the disintegration conditions. The starting material can be an aqueous gel at a concentration of 0.5-5%. The gel of this type contains thus a great amount of water which is to be removed so that a network of cellulose fibrils forming the body of the membrane and causing the structural integrity and strength properties of the membrane is left. This network may contain other solids as well that were originally dispersed in the aqueous gel, but the cellulose fibrils are the main constituent of the membrane.

Liquid Removal

To form a solid free-standing membrane where cellulose fibrils are arranged in a network, liquid must be removed. Liquid is removed from fibril cellulose by a method comprising two steps. In the first step liquid is drained by reduced pressure from a fibril cellulose dispersion through a filter fabric impermeable to the fibrils which causes the formation of a wet membrane sheet still containing large amounts of liquid. In the second step heat is applied on the opposite side of the membrane sheet while a pressure difference is maintained over the filter fabric, causing the drainage from the membrane sheet to continue.

In the following, liquid removal is described when water is the dispersing medium that is to be removed from the fibril cellulose dispersion. The operations can be performed analogically when other liquid than water is the dispersing medium.

Figure 2:
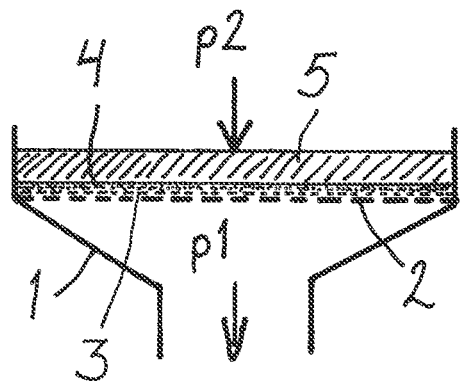

FIGS. 1 and 2 show a first embodiment where a modified laboratory sheet mold 1 is used. In this figure and in other figures illustrating the method various elements are not drawn to scale. Aqueous fibril cellulose dispersion 4 is applied on top of a filter fabric 3 which has holes in micrometer range. The filter fabric 3 is supported by a wire 2 of the sheet mold 1. In the first step, which is shown in FIG. 1, the dewatering from the dispersion 4 through the filter fabric 3 and wire 2 is caused by reduced pressure p1 (vacuum) that is effective on the free side of the filter fabric 3 (side not covered by the fibril cellulose dispersion 4). Thus, water flows through the filter fabric and wire and the dry matter content of the dispersion 4 is gradually increased concurrently with the removal of water.

After a wet membrane sheet 4 is formed on the filter fabric through dewatering and dewatering through the filter fabric 3 has ceased, the second step shown in FIG. 2 is initiated. The surface of a heated body 5 is placed on top of the membrane sheet 4 and the membrane sheet is pressed, its whole surface in contact with the body 5, against the filter fabric 3 and the reduced pressure p1 (vacuum) is still maintained. The pressure caused by the heated body 5 is designated p2 (arrow). The dewatering continues through the combined effect of the pressure p2 and the reduced pressure p1, which causes a pressure difference over the filter fabric and removal of more water from the membrane sheet through the filter fabric. The surface of the body 5 transfers heat to the membrane sheet 4 which enhances the dewatering because of the rise of the temperature of the membrane sheet 4 and especially temperature of the water contained in it. The temperature of the body 5 can be for example 90° C. The body 5 can be of metal. The contact surface of the metal body is coated with a thin coating that prevents adherence of the membrane sheet 4, for example PTFE, which is resistant to temperatures used in heating the membrane sheet 4. In the FIG. 2, the body 5 is a metal plate.

The body 5 is preferably preheated so that the temperature of the membrane sheet 4 starts to rise immediately after it has been placed against the membrane sheet 4. The body 5 is heated externally during the pressing so that the temperature is maintained.

After the dewatering has proceeded to a suitable dry matter content, the membrane sheet 4, which is self-supporting membrane because of the formed cellulose fibril network, is detached from the filter fabric 3 and removed from the mold 2. The mold 2 can be used thereafter for the manufacture of the next membrane.

Figure 3:
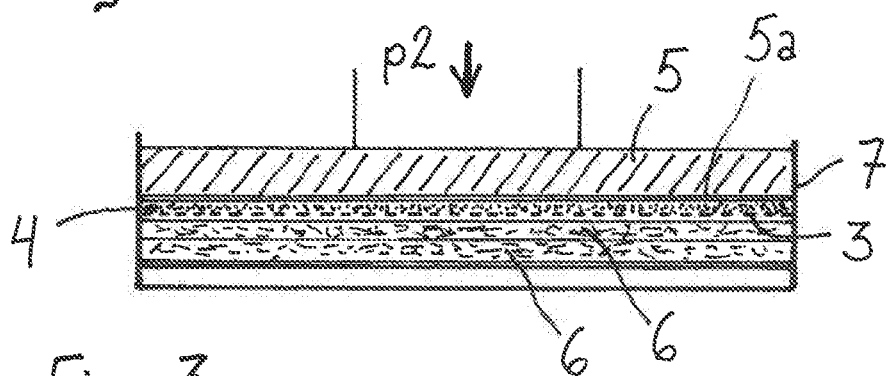
FIG. 3 shows a pressing step according to a second embodiment of the method.

In the embodiment of FIGS. 1 and 2, all steps are performed in the same sheet mold 2. FIG. 3 shows an embodiment where the dewatering from the dispersion 4 through the filter fabric 3 and wire 2 was initially caused by reduced pressure p1 in conformity with FIG. 1. FIG. 3 shows the second step, where the wet membrane sheet 4 together with the filter fabric 3 is removed from the sheet mold 1 and transferred to a press 7 where it is placed with the filter fabric on one or several absorbent sheets 6 so that the free surface of the filter fabric 3 comes in contact with the surface of the absorbent sheet 6. The absorbent sheet 6 can be made of fibrous material and is capable of receiving water inside its volume. The sheet 6 can be absorbent pulp sheet, blotting paper or piece of drying felt. As shown by FIG. 3, the sheets 6 can be stacked to increase the water-receiving volume.

A heated body 5 which can have similar structure and function as in FIG. 2 is placed on the free surface of the wet membrane sheet 4. Mechanical pressure p2 is applied to the membrane sheet 4 by means of the body 5. Dewatering is caused by the pressure difference effected by the mechanical pressure p2 only, and the water squeezed out of the membrane sheet 2 flows through the filter fabric 3 into the adsorbent sheet 6 or absorbent sheets, where it is retained by the volume of the absorbent sheet(s) 6. The heat is transferred from the body 5 to the membrane sheet 4 as in the embodiment of FIGS. 1 and 2. Below the absorbent sheet(s) 6 there can be a cold metal surface which is kept at a relatively low temperature so that a temperature gradient is created through the wet membrane sheet 4 and the absorbent sheet(s) 6 to urge water from the high temperature towards the lower temperature. The temperature of the metal surface can be adjusted for example below 25° C., preferably below 20° C. The non-adherent coating on the contact surface of the body 5 is designated 5a. After the dewatering has proceeded to a suitable dry matter content, the membrane sheet 4 and the filter fabric 3 are detached from the press 7 and the membrane sheet 4, which is self-supporting membrane because of the formed cellulose fibril network, is detached from the press filter fabric 3. The filter fabric 3 can next be used in the sheet mold 1 for the formation of a new membrane sheet 4. The absorbent sheet or sheets 6 is/are detached from the press 7, dried, and reused in the press 7.

In the embodiment of FIG. 3, the first step (dewatering by vacuum) takes less than 60 s when the target grammage of the membrane is 20 gram per square meter. The second step (pressing+heating) takes less than 5 minutes. The total preparation time starting form the fibril cellulose dispersion and ending in a dry membrane is less than 10 minutes, whereas in conventional methods the preparation time can be several hours.

Figure 4:
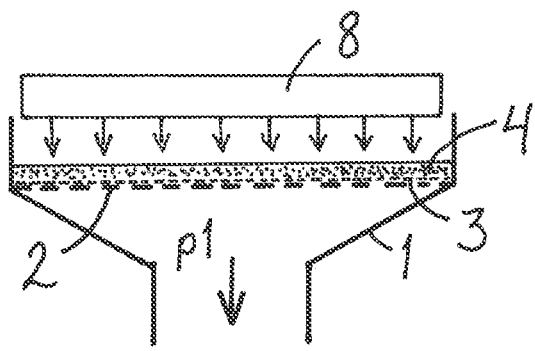
FIG. 4 shows a drying step according to a third embodiment of the method.

FIG. 4 shows an embodiment where the first step was performed as in FIG. 1, by reduced pressure p1 (vacuum). The heat applied on the opposite side of the membrane sheet 4 being formed is not accomplished by contact (conduction) with a heated surface 5 as is case in FIGS. 2 and 3, but by irradiation of the free surface of the membrane sheet (radiation heat) by an IR heating device 8 that is placed at a distance from the membrane sheet 4. Mechanical pressure is not applied, but the water is drained from the membrane sheet 4 through the filter fabric 3 by the effect of pressure difference caused by the reduced pressure p1 only.

In the embodiments of FIGS. 1 to 4, the fibril cellulose dispersion can be applied in two phases in the first step. If the fibril size of the fibril cellulose is so small that the fibrils are likely to penetrate through the filter fabric 3 (size is smaller than the cutoff size of the filter fabric), a first fibril cellulose dispersion having a larger fibril size is first applied on the filter fabric 3, and this dispersion after dewatering by the reduced pressure p1 forms a fibril network p1 that acts as auxiliary filter for the main fibril cellulose dispersion having cellulose fibrils of said small size when it is applied afterwards on the fibril network. The dewatering by reduced pressure p1 is completed, and the second step of dewatering can be performed as in FIGS. 2 to 4. The fibrils of the first fibril cellulose dispersion will remain on the surface of the membrane as a thin surface layer, the smaller fibrils of the main fibril dispersion forming the body and strength properties of the membrane.

Compared with dewatering of fibril cellulose dispersions where the cellulose is native cellulose, dewatering of fibril cellulose dispersions where the cellulose is anionically charged cellulose is even more time-consuming because water is bound very strongly to the cellulose. Fibril cellulose containing anionically charged groups can be for example chemically modified cellulose that contains carboxyl groups as a result of the modification. Cellulose obtained through N-oxyl mediated catalytic oxidation (e.g. through 2,2,6,6-tetramethyl-1-piperidine N-oxide, known by abbreviation "TEMPO") or carboxymethylated cellulose are examples of anionically charged fibril cellulose where the anionic charge is due to a dissociated carboxylic acid moiety. If embodiments of FIGS. 1 to 4 are used for making membranes from fibril cellulose containing anionic groups, the total drying time is expected be many times the total drying time with fibril cellulose where the cellulose is unmodified, mainly du to the higher water retention capacity and higher viscose of the anionically charged fibril cellulose. For example dewatering unmodified fibril cellulose in the first step when the target is a 20 gram per square meter membrane takes less than 60 s (time from starting the vacuum till no visible water is seen on the membrane sheet), whereas dewatering of a anionically charged fibril cellulose for a membrane with the same target grammage in similar conditions can take even 60 to 120 minutes.

The dewatering properties of these anionically charged fibril cellulose grades can be considerably improved by pretreating the fibril cellulose dispersion by an acid. When the fibril cellulose contains anionically charged groups that act as bases (acid moieties in dissociated from), as is the case with oxidized cellulose and carboxymethylated cellulose, lowering the pH with acid will convert these groups to undissociated form, the electrostatic repulsion between the fibrils is no more effective, and the water-fibril-interaction is changed in a way that favors the dewatering of the dispersion (water retention capacity of the dispersion is reduced). The pH of the anionically charged fibril cellulose dispersion is lowered below 4, preferably below 3 to improve the dewatering properties.

Anionically charged fibril cellulose dispersion which was obtained from "TEMPO" oxidized pulp needed a dewatering time under vacuum of roughly 100 min at original (unadjusted) pH, when the target grammage of the membrane was 20 gram per square meter. When the pH of the dispersion was lowered to 2 with HCl before the dewatering, the dewatering time in the same conditions was about 30 seconds, that is, the time was reduced to 0.5% of the original. The dispersion becomes visibly aggregated (fibril flocks are formed) when the pH is lowered, which is believed to be one reason for faster dewatering because water flows more easily between the aggregates.

The membrane sheets formed in the first step by dewatering the dispersion where the pH is lowered can be dried to final dryness in the second step in some of the ways shown by FIGS. 2 to 4. The tendency of the membranes to tear during the final stages of the drying, which is probably due to the initially aggregated structure of the dispersion at low pH, can be eliminated by interrupting the drying. The membrane sheet is then allowed to lie free and detached from any supporting structure (such as filter fabric) to relieve the stresses. Thereafter the drying can be continued. The final stages of the drying can be performed between two absorbent sheets (for example blotting papers) at a temperature above 100° C., for example at 105° C., to remove the remaining moisture.

If the fibril size of the anionically charged fibril cellulose is too small with regard to the filtration capacity of the filter fabric (cutoff size), which often is the case with fibril cellulose made from oxidized pulp, an auxiliary filter layer can first be formed of fibril cellulose dispersion with larger fibril size on the same principle as explained above, before the pretreated fibril cellulose dispersion is added. The auxiliary filter layer can be made for example of chemically unmodified (native) fibril cellulose dispersion where the fibril size is larger.

When the fibril cellulose dispersions are applied to the filter fabric 3, they can be applied by pouring, or some other application methods for making initially an uniform layer of the dispersion with minimal thickness variations can be used. The dispersions can for example be sprayed on the filter fabria. If necessary, the dispersion may be diluted with water to decrease the viscosity and improve the uniform spreading of the dispersion.

Figure 5:
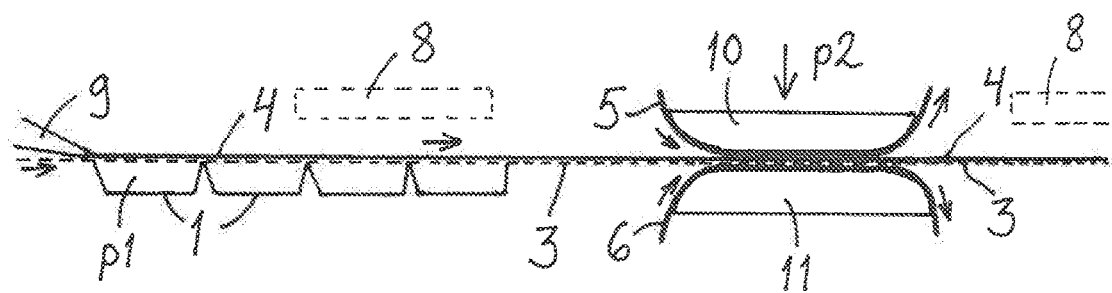
FIG. 5 is a schematic representation of a continuous method according to one embodiment.
Figure 12:
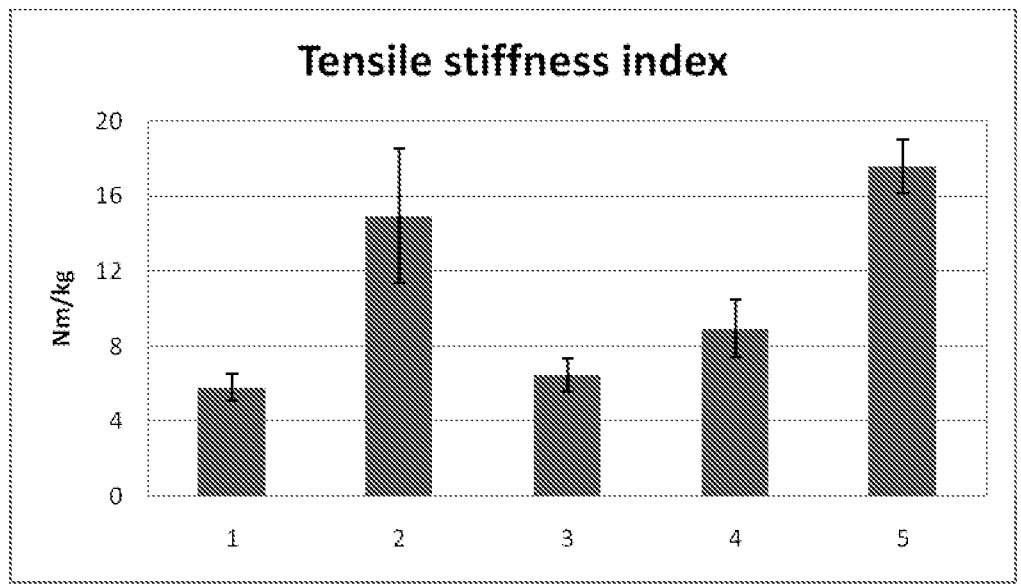

FIG. 5 shows an example of a continuous preparation method where a continuous membrane 4 is formed starting from a fibril cellulose dispersion which is fed from a wide nozzle 9 on top of a moving filter fabric 4 which has the properties of the filter fabric in the above-described embodiments. The fibril cellulose dispersion can be any grade discussed above, containing unmodified cellulose or acid pretreated anionically charged cellulose. The filter fabric can be supported below by a wire to add mechanical strength. The fibril cellulose dispersion forms a continuous layer on top of the filter fabric 3 and undergoes the same dewatering phases as in FIG. 12 as the filter fabric 3 carries the fibril cellulose forward. The fibril cellulose is first subjected to reduced pressure p1 by the effect of vacuum chambers 1 placed underneath the filter fabric, which causes dewatering of the dispersion and forming of a wet membrane sheet 4 where the fibril network starts to form. The vacuum level (reduced pressure p1) can vary in different vacuum chambers. The membrane sheet 4 is next carried by the filter fabric 3 to a pressure and heating section which corresponds to the second step (FIG. 2) of the embodiment of FIGS. 1 and 2. In this section a continuous heated belt 5 is placed in contact with the upper surface of the membrane sheet 4 over some length, and on the opposite side in the area of this contact, a continuous absorbent sheet 6 is placed underneath the filter fabric 3 in contact with it. The composition of the belt 5 and the absorbent sheet 6 can correspond to the compositions in the embodiment of FIGS. 1 and 2. The belt 5 can be a metal sheet with a thin non-adherent coating, such as PTFE, on the side facing the membrane sheet 4. The absorbent sheet 6 can be a fibrous sheet capable of receiving water pressed out of the membrane sheet in its volume. Two or more sheets can be placed on top of each other. The belt 5 and absorbent sheet 6 are guided through guide shoes 10, 11 to the opposite sides of the membrane sheet 4 and filter fabric 3. Pressure p2 is applied over the contact area of the belt 5 through the guide shoe 10 to the membrane sheet 4 to press water through the filter fabric 3 to the absorbent sheet 6. Over the same contact area, the membrane sheet 4 is also heated by the belt 5.

The absorbent sheet 6 and the belt 5 move in the same velocity as the filter fabric 3 so that the structure of the membrane sheet remains intact during the final drying step. The belt 5 and the absorbent sheet 6 form an endless loop that can be guided by rollers. The filter fabric 3 also forms an endless loop whose return run to the supply point of the fibril cellulose suspension is not shown.

The velocity of the filter fabric 3 is fitted to the length of the vacuum chambers 1 and the length of the contact area of the heated belt 6 so that a sufficient degree of dewatering is attained during each step. When the membrane sheet 4 and the filter fabric 3 issue form the heating and pressing section, the membrane sheet is at a dry matter content where it can be separated from the filter fabric 3 as a continuous membrane, which can be reeled or cut to predetermined sizes.

FIG. 5 also shows the possibility of additional heating by means of irradiation heat in the same way as in FIG. 4. The free surface of the membrane sheet 4 is heated by an IR heating device 8 in the area of applying reduced pressure (in the area of vacuum chambers 1). Additional heating by an IR heating device is shown also after the area of applying heat and pressure (after the press unit formed by the belt 5 and absorbent sheet 6).

The apparatus of FIG. 5 can comprise also two or several press units of aforementioned type successively along the path of the membrane sheet 4. IR heating devices 8 can be placed between the press units. The last IR heating devices 8 can cause the surface temperature of the membrane sheet to be even higher than 100° C., if the membrane sheet 4 is dry enough at that point.

Figure 6:
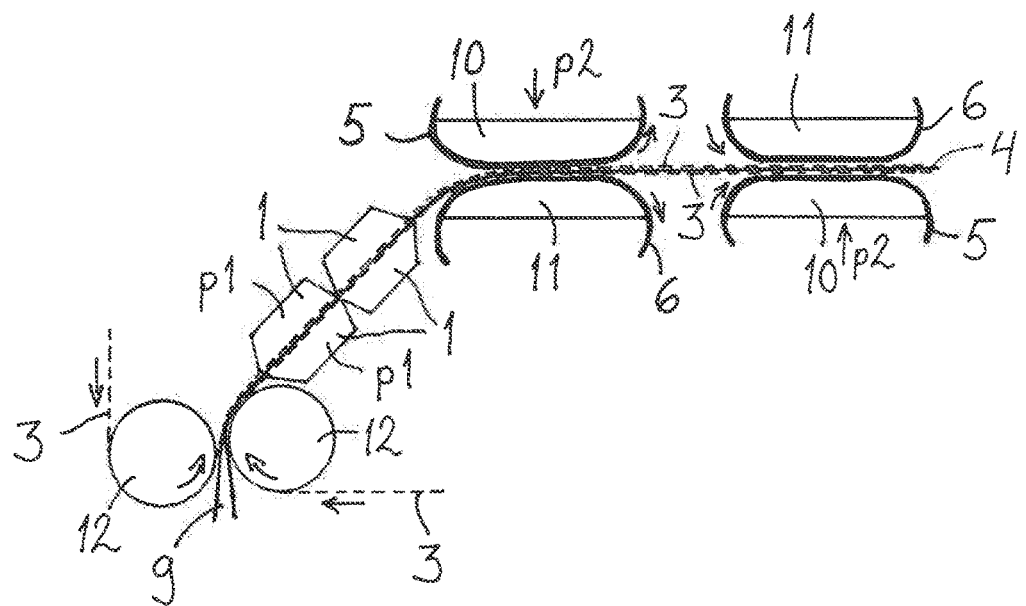
FIG. 6 is a schematic representation of the continuous method according to another embodiment.

FIG. 6 shows another embodiment of a continuous method. In this embodiment the treatment is two-sided with respect to the dewatering, that is, the water is first filtered by reduced pressure to both sides of the forming membrane sheet through two filter fabrics 3, between which the fibril cellulose dispersion is supplied from a wide nozzle 9. The filter fabrics 3 are brought together by two rollers 12 so that the dispersion and subsequently forming membrane sheet 4 remain between the fabrics 3 while the dewatering takes place in opposite directions to vacuum chambers 1 placed on both sides of the fabrics 3. The combined pressure and temperature treatment is also two sided, that is, water is removed by the effect of temperature and pressure to both sides from the membrane sheet 4. In FIG. 6 this is accomplished by first applying pressure and heat to the first side of the membrane sheet 4 through first fabric 3 to remove water to the second side through the second fabric 3, whereafter pressure and heat is applied to the second side of the membrane sheet 4 through the second fabric 3 to remove water to the first side through the first fabric 3. In the setup of FIG. 6 there are two successive presses, formed each by a heated pressure surface and absorbent sheet. The heated pressure surface and absorbent sheet are in reversed order in the second press as compared with. the first press. As in FIG. 5, the press comprises a moving heated metal belt 5 and an absorbent sheet 6 on opposite sides of the membrane sheet 4, as well as guide shoes 10 and 11. If the strength of the membrane sheet allows, a filter fabric 3 can be guided away from the membrane sheet 4 before a press so that the surface of the membrane sheet will be exposed for direct contact with the heated surface in the press.

The concept of fibril network used as auxiliary filter can be used also in the continuous method of FIG. 5 by supplying the larger-sized fibril cellulose dispersion to the moving filter fabric 3 and dewatering it by reduced pressure before the supply point of the main fibril cellulose dispersion where the fibrils are of smaller size. In this case there are two successive nozzles 9 which supply different dispersions at two successive points.

The method for preparing individual membranes according to the embodiments of FIGS. 1 to 4 can be used for preparing small series of special membranes for example for medical use. The area of the final membrane is dependent on the working area of the mold 1 where the initial filtering takes place. Larger membranes can be prepared by increasing the working area of the mold 1 and the working area of the press 7. The continuous preparation method of FIGS. 5 and 6 can be used for preparing membranes for packaging applications, for example for making biodegradable gas barrier membranes for food package applications.

When the membrane is separated form the filter fabric through which the water has been filtered under its formation, a freestanding membrane consisting of fibril cellulose is formed. However, its also possible that the filtration takes place through a filter layer that will remain as a structural part of the membrane product. In this case the adhesion between the filter layer and the membrane sheet during its dewatering is desirable. The filter layer can be in this case a fibrous layer that can retain the fibril cellulose as a uniform layer but allows water to pass through, for example a nonwoven sheet. Paper can be used as a filter layer, in which case the formation of membrane sheet from fibril cellulose on top of the paper will be sort of coating process. All embodiments shown in FIGS. 1 to 4 for making individual membranes can be used, in which case the filter fabric 3 will be replaced by a filter layer, such as a non-woven sheet or paper, which will remain adhered to the membrane after all treatment steps. In the continuous production method of FIG. 5 the filter fabric 3 can also be replaced by a filter layer, such as a non-woven layer or paper, which will act as filter and remain adhered to the membrane sheet. A support fabric with a coarse mesh can support and carry the filter layer below, and the combined filter layer and membrane can be detached from the support fabric when its has undergone the drying steps.

The membrane that has been made from fibril cellulose to a freestanding membrane can be in a later phase laminated to other substrates in sheet form, like paper, cardboard or plastic film to improve their properties, for example barrier or strength properties. These fibril cellulose membranes can also be laminated together to form a thicker fibril cellulose membrane.

Thin membranes with uniform grammage distribution (small grammage variation over the area of the membrane) can be prepared by the method. The thickness of the membranes is preferably no higher than 50 μm, preferably in the area of 5 to 50 μm. If a freestanding membrane is prepared, the thickness is preferably in the range of 10 to 50 μm and still more preferably 20 to 50 μm to confer it sufficient strength, whereas when forming a membrane layer in a membrane product (either adhered to the filter layer or laminated separately to a support) its thickness can be smaller, in the range of 5 to 40 μm. However, these numerical values should not be regarded as restrictive.

The membrane made of fibril cellulose can constitute exclusively of cellulose fibrils. It is possible that some auxiliary agents originally present in the dispersion either in dissolved or solid form will be included in the membrane, provided that they do not interfere with the strength properties of the membrane. In case of other solid agents, they are preferably other substances than cellulose or their derivatives, the fibril cellulose being the only cellulose-based solid substance in the membrane. Soluble substances that can be used include water-soluble polymers. Polymers in latex form can also be used as one constituent.

Materials

Five different types of fibril cellulose were used in the experiments: Sample 1 was prepared form bleached birch pulp without any additional chemical pre-modification, Sample 2 was similar to sample 1, but it washed to sodium form prior to fibrillation, Sample 3 was carboxymethylated prior to fibrillation, Sample 4 was modified with TEMPO catalyzed oxidation prior to fibrillation, Sample 5 was modified with TEMPO catalyzed oxidation prior to fibrillation and changed to acid form after fibrillation. Samples 1, 3, 4, and 5 were fibrillated with Masuko-type grinder (Masuko Sangyo Co.) and Sample 2 was fibrillated with commercial fluidizer (Microfluidics Co.). Different samples are described in Table 1.

TABLE 1

Summary of the different fibril cellulose samples.

| Sample | Pre-modification | Fibrillation | pH |
|---|---|---|---|
| 1 | None | Masuko grinder | 7 |
| 2 | Na wash | Fluidizator | 7 |
| 3 | Carboxymethylation | Masuko grinder | 7 |
| 4 | Oxidation | Masuko grinder | 7 |
| 5 | Oxidation | Masuko grinder | 3 |

Biodegradable polymer film, Bioska, was prepared by Plastiroll Ltd., Finland.

Dewatering Time Dependence on Grammage

Figure 7:
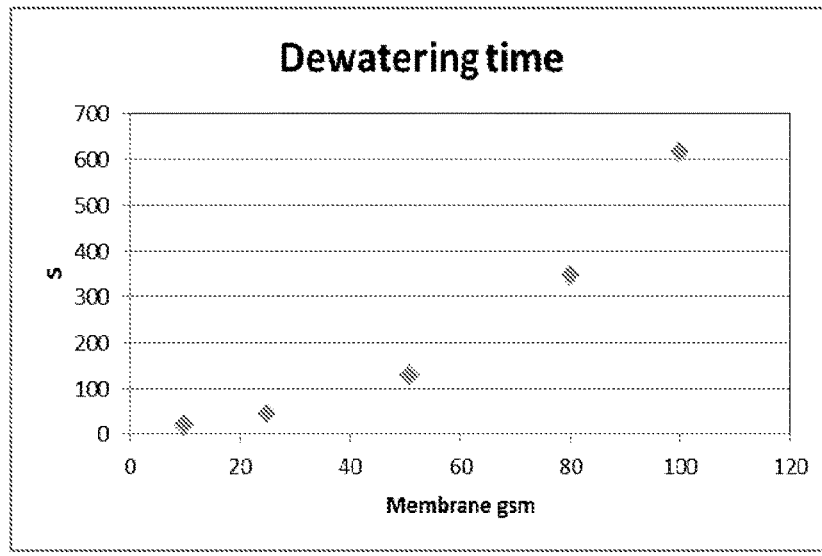
FIGS. 7 to 15 present results of experiments performed on various membranes.

Dewatering time increases exponentially ($R^2$=0.9901) when membrane grammage is increased (FIG. 7). It is determined as time between starting the vacuum and the moment when there is no more visible free water on the membrane. Data on FIG. 7 (correlation of first stage dewatering time and membrane grammage) is from tests with Sample 1 type fibril cellulose. Dewatering times are much longer when higher viscosity NFCs, such as anionically modified samples 3 and 4, are used. Dewatering time of 20 gsm membrane is less than 60 seconds with native grade (sample 1), but it can be 60-120 minutes for the same grammage with samples 3 and 4. Dewatering time can be decreased by lowering pH.

Basic Properties of the Membranes Made of Native Fibril Cellulose (Sample 1)

Figure 8:
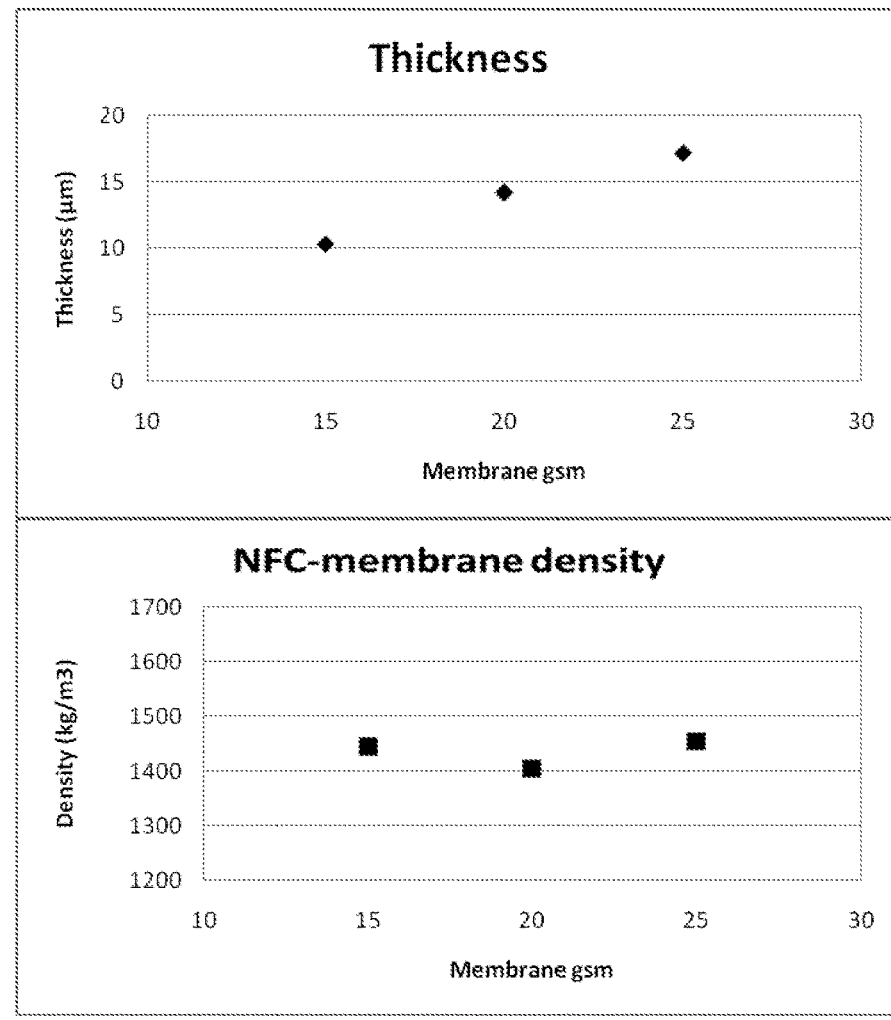

Membrane densities varied between 1400 and 1450 kg/m$^3$ (FIG. 8). These values were rather high and suggested that the pore volume in the membranes was very low. This was also supported by low air permeability, since no air passed through the membranes in standard laboratory measurement. Also, from AFM images (FIGS. 16-18) of three different films, it is evident that the surface structure of the films is very smooth and tight.

When membrane grammage was increased from 15 to 25 gsm, thickness increased linearly from 10 to 17 μm (FIG. 8; thickness and density of fibril cellulose membranes with different grammage). Membrane's density was not affected by grammage increase.

Figure 9:
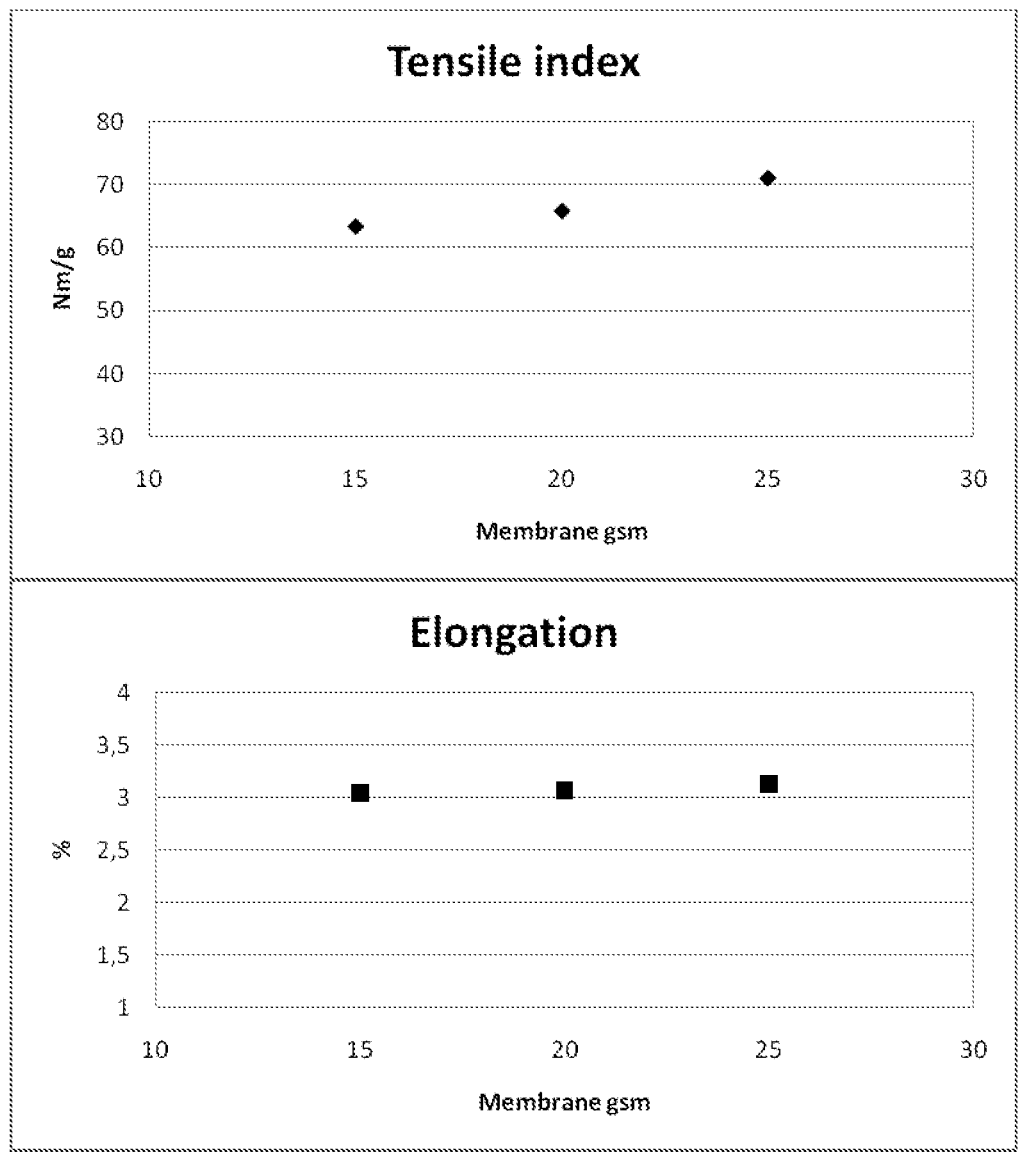

Increasing the grammage from 15 to 25 gsm increased the tensile index while the elongation at break of the membranes remained constant (FIG. 9; tensile index and break elongation of test series membranes).

Membranes from Different Fibril Cellulose Grades

Figure 10:
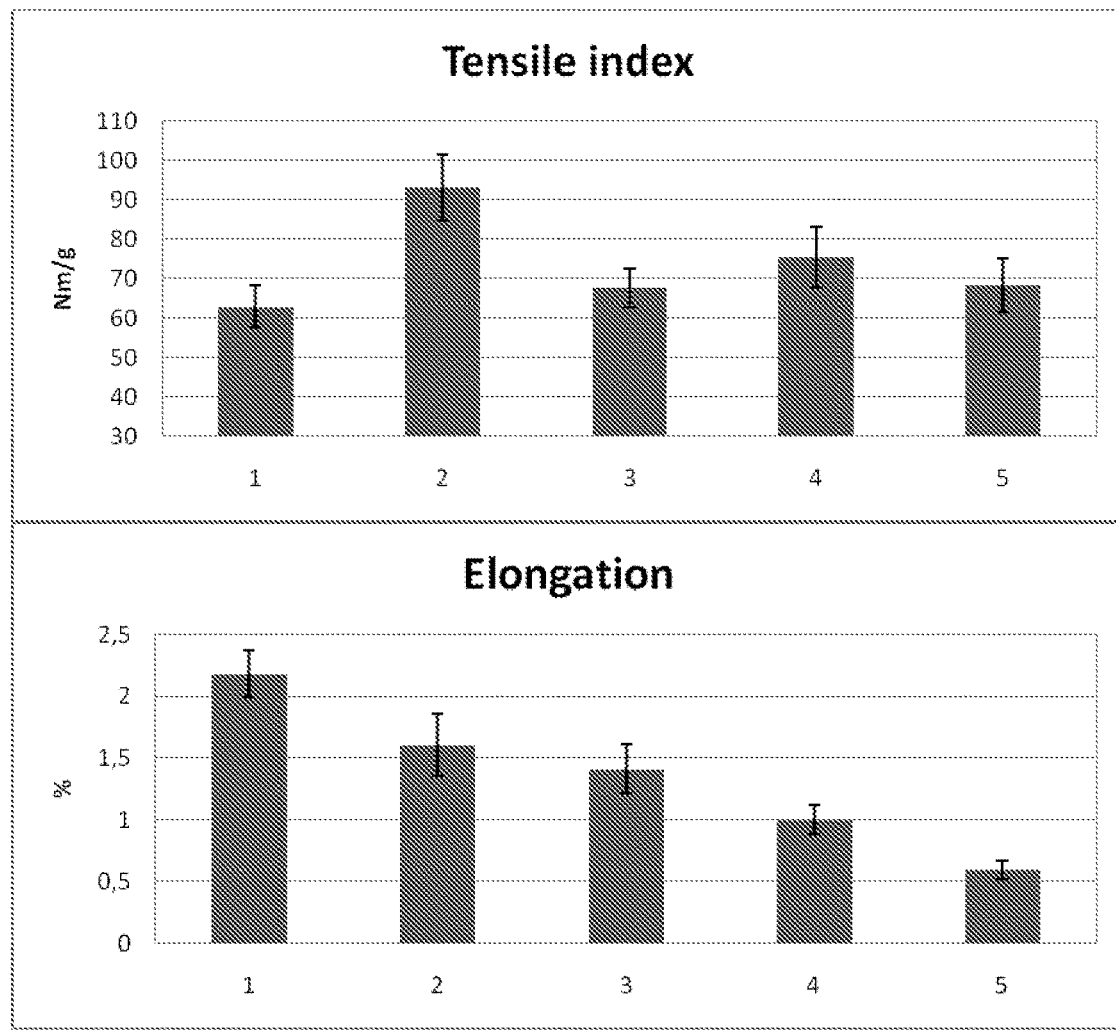
Figure 11:
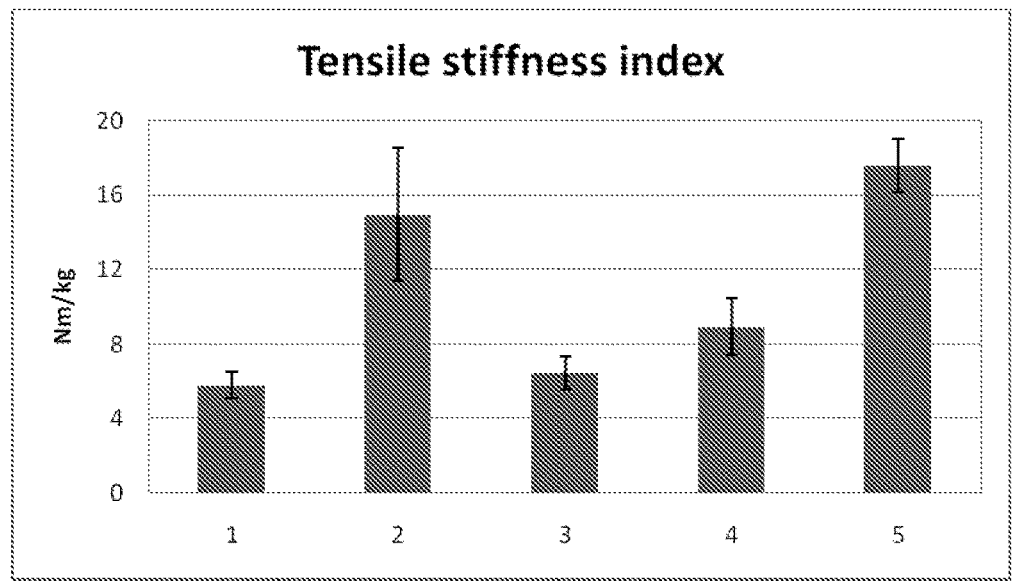

Fibril cellulose membranes were made from various samples, described in Table 1. Tensile index and break elongation of the membranes made from the different fibril cellulose samples are presented in FIG. 10. The values were measured from 20 gsm membranes. Tensile strength was higher with modified samples (samples 3 and 4) than with coarser native grade (sample 1). Elongation at break, on the other hand, decreased. From FIG. 10 it can be seen that it may be beneficial to exchange the counter ions to sodium for native grades. Lowering pH to 3 increased stiffness of oxidized sample remarkably, see sample 4 vs sample 5 in FIG. 11 (tensile stiffness index of the membranes made from the different fibril cellulose samples).

Cross-Linked Membranes from Native Fibril Cellulose

Mechanical properties of fibril cellulose membranes can be altered by using various types of cross-linkers in the manufacturing process. For example, moisture sensitivity of the membranes can be lowered by cross-linking the fibrils with ammonium zirconium carbonate. This method was demonstrated in following manner:

The membranes for these tests were made with Sample 1 type fibril cellulose. Ammonium zirconium carbonate (AZC) was added to the fibril cellulose dispersion just before dewatering in dose of 30% of the NFC. The membranes were made in the grammage of 10 gsm.

Figure 13:
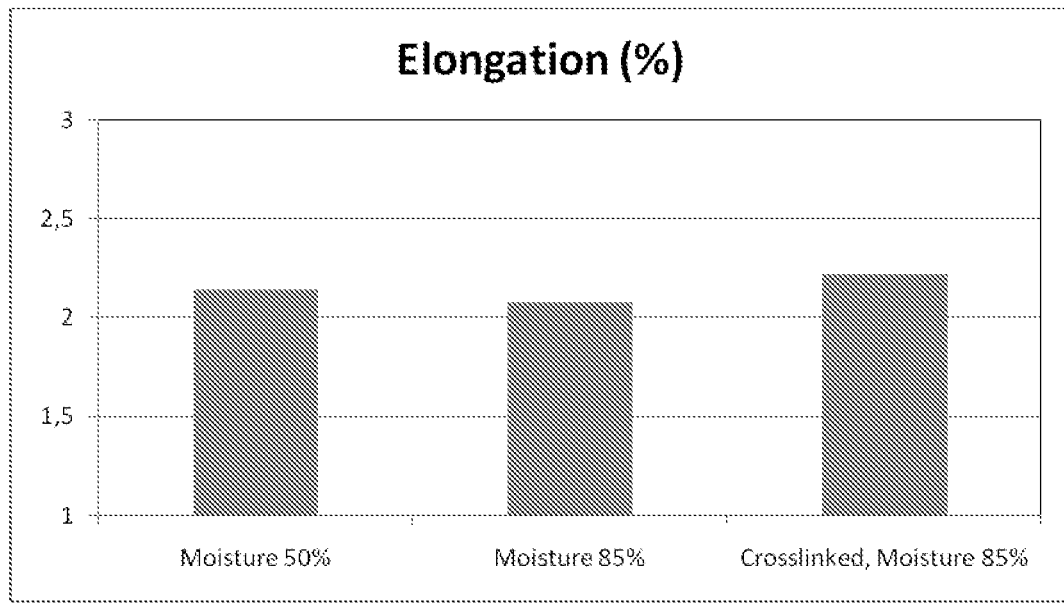

The mechanical properties were tested at relative humidity of 50% and 85%. It was noticed that cross-linked membranes were insensitive to changes in environment moisture, see FIGS. 12 and 13, where tensile strength index and elongation at break are shown. Without additional cross-linking, the tensile strength of fibril cellulose membranes decrease remarkably at elevated humidity.

Laminates of Fibril Cellulose Membranes and Biodegradable Plastic Films

The membranes of these tests were made with sample 1.

In this set of tests fibril cellulose membranes of three different grammages were made and laminated with Bioska plastic films. Grammages were 5, 10 and 20 gsm. The wet membrane film was formed first by removing water through a filter fabric by reduced pressure, and after the first stage, the Bioska film was placed on top of still unpressed membrane on the sheet mold. Then the membrane/Bioska film combination was taken to the second stage where the pressing was carried out as in FIG. 3, by heated PTFE-coated pressing plate with the Bioska film between the wet membrane sheet and the plate and adsorbent sheets in contact with the opposite side of the membrane sheet. The temperature of the heated surface was 90° C.

Figure 14:
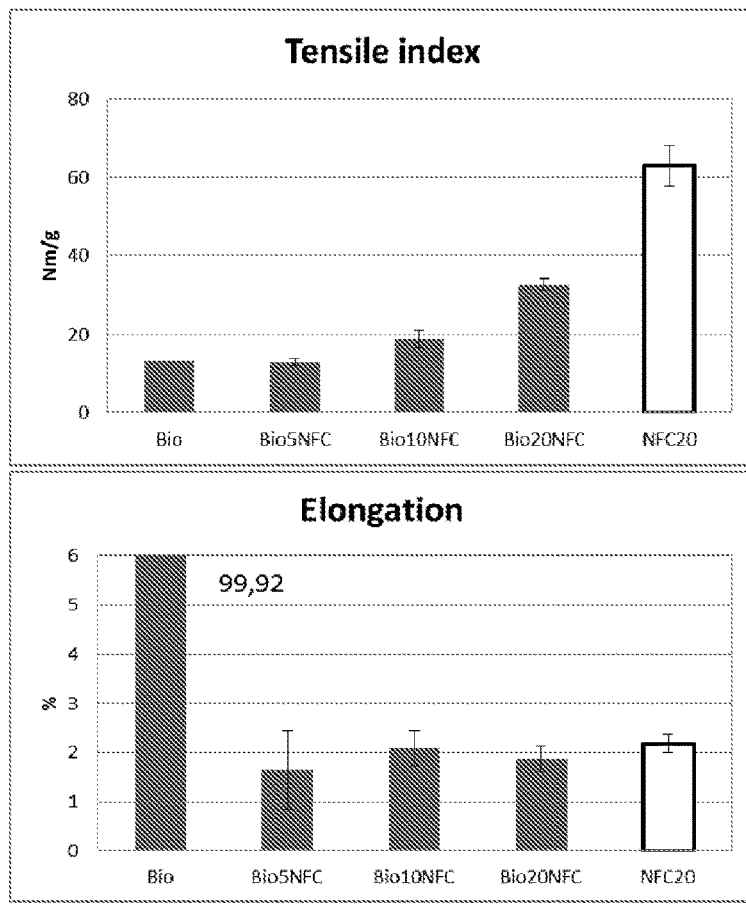
Figure 15:
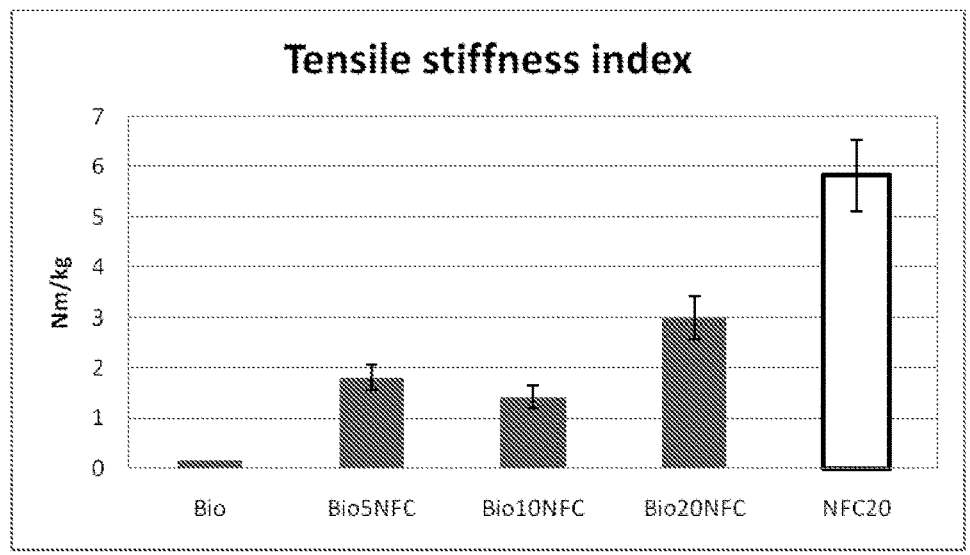

There are five test points shown in the FIGS. 14 and 15. In the FIG. 14, tensile index and break elongation values of fibril cellulose membrane-Bioska laminates are shown. Bio sample is pure Bioska film, Bio5NFC is Bioska film with 5 gsm membrane, Bio10NFC is Bioska film with 10 gsm membrane, Bio20NFC is Bioska film with 20 gsm membrane, and NFC20 sample is reference 20 gsm fibril cellulose membrane. In FIG. 15 the tensile stiffness index of the same fibril-cellulose membrane-Bioska laminates are shown. Thus, the first point (bio) shows the values of mechanical properties for the Bioska film, last point (NFC20) shows the values of 20 gsm NFC-membrane, and between these points there are the values for laminates with three different NFC grammages. The mechanical properties were measured with the MTS 400 device. Same parameters (Scan P-38) were used, except that the sample strip length was 5 cm instead of 10 cm. Standard device was not used because of the NFC/Bioska laminates behaved in different manner during the measurement than paper samples, and the standard device could not record data as it should have.

When a paper sample is loaded it elongates until it breaks. In the case of these laminates the NFC stretched and broke, while Bioska film continued to stretch for a long time. When the grammage of the NFC-membrane in the laminate was increased the laminate's tensile strength increased. The tensile index of Bioska/20 gsm NFC-laminate was about 50% of 20 gsm NFC-membranes strength, but about three times better than that of the Bioska film alone (FIG. 14). Break elongation of laminates was practically the same as that of a NFC-membrane (FIG. 14). Stiffness of the laminated structures were also increased compared to pure Bioska film, FIG. 15.

Other structural material layers than plastic films, such as cardboard or paper, can be laminated analogically to the membrane sheet of fibril cellulose by interposing the structural material layer between a heated surface and the wet sheet of fibril cellulose and applying pressure for dewatering.

Figure 16:
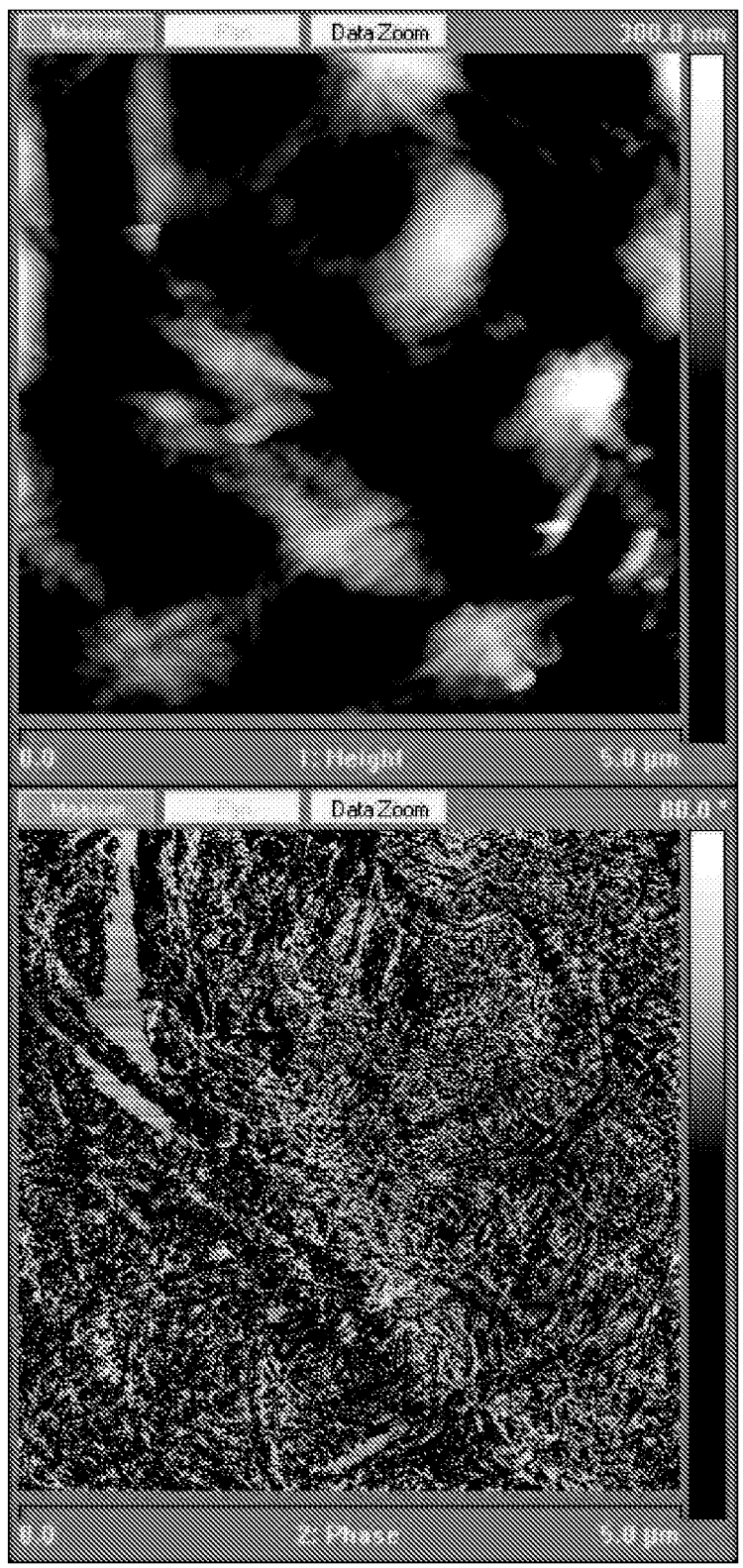
FIGS. 16 to 18 are AFM images of fibril cellulose membranes made from different samples.
Figure 17:
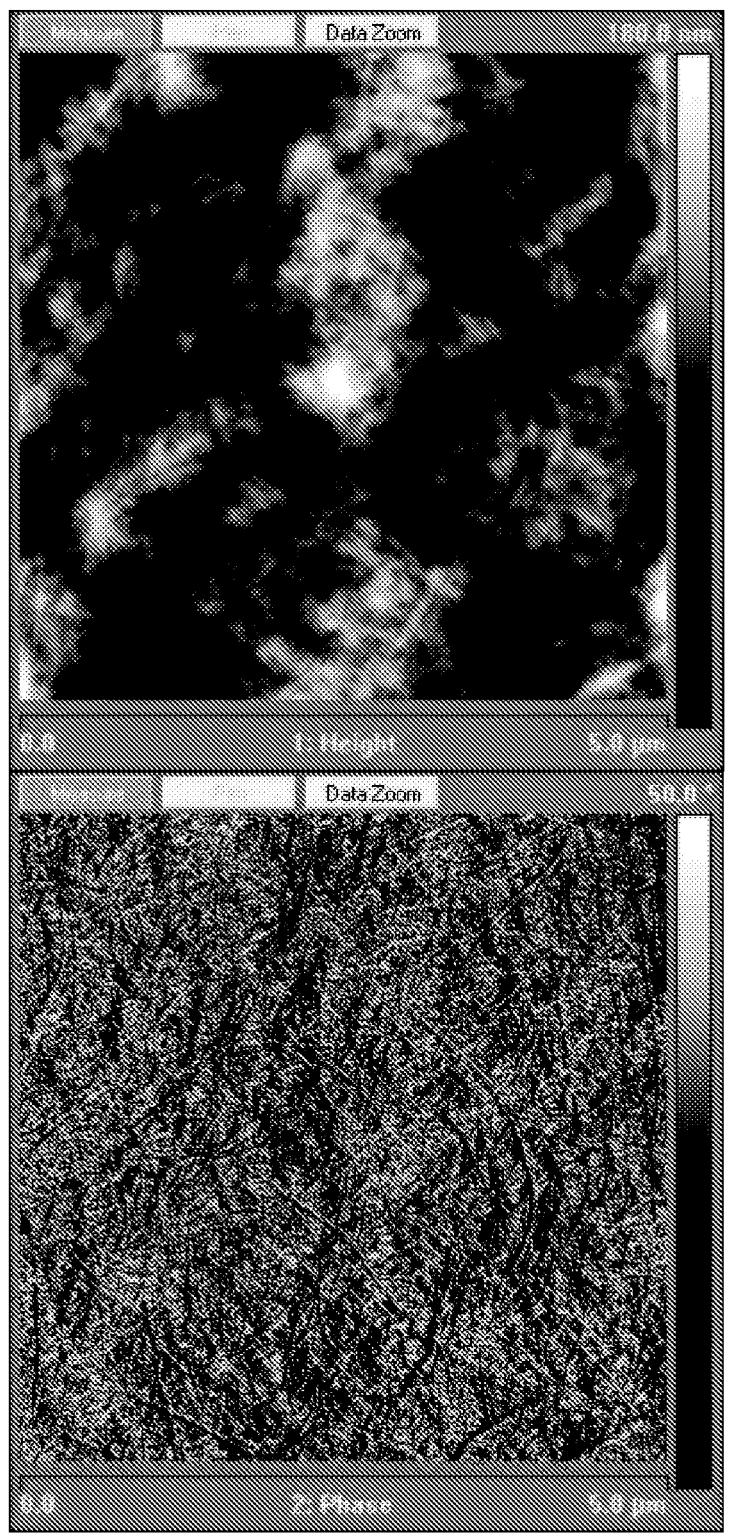
Figure 18:
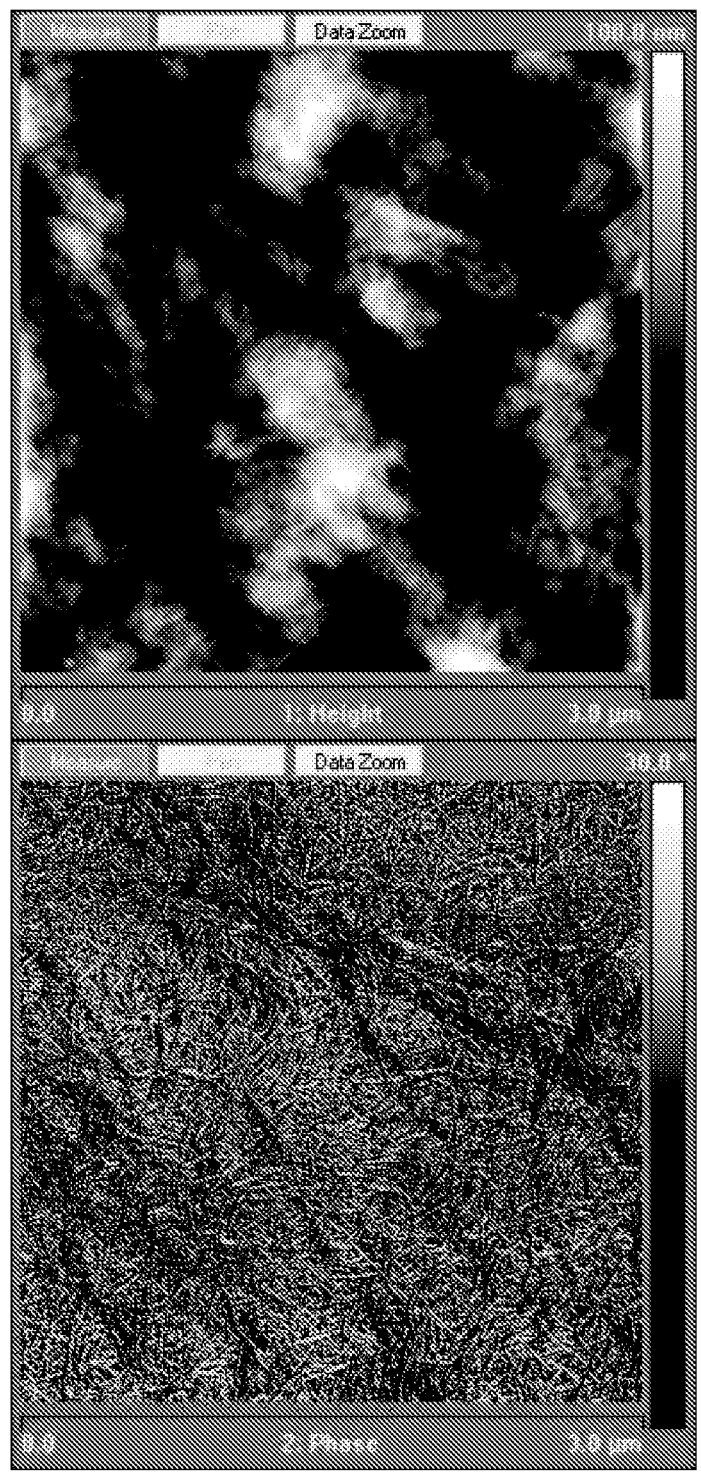

FIGS. 16 to 18 are AFM (atomic force microscopy) images of fibril cellulose membranes made from different samples. FIG. 16 is an AFM image of the membrane made from sample 1 (fibril cellulose from non-premodified bleached birch pulp). FIG. 17 is an AFM image of the membrane made from sample 2 (fibril cellulose from bleached birch pulp washed to sodium from prior to fibrillation). FIG. 18 is an AFM image of the membrane made from sample 4 (fibril cellulose from bleached birch pulp modified by TEMPO catalyzed oxidation prior to fibrillation).

The invention claimed is:

1. A method for preparing a nanofibrillar cellulose membrane, the method comprising:
    supplying a nanofibrillar cellulose dispersion on a filter layer;
    draining liquid from the nanofibrillar cellulose dispersion by the effect of reduced pressure through the filter layer that is impermeable to fibrils of the nanofibrillar cellulose but permeable to the liquid to form a membrane sheet on the filter layer;
    continuing draining the liquid from the nanofibrillar cellulose while applying heat to a side of the membrane sheet opposite the filter layer to promote the removal of the liquid in liquid state while continuing draining of the liquid through the filter layer by pressure difference over the filter layer; and
    subsequent to the heat application, removing the membrane sheet from the filter layer as the nanofibrillar cellulose membrane, the nanofibrillar cellulose membrane being freestanding.

2. The method according to claim 1, wherein heat applied on the opposite side of the membrane sheet to the membrane sheet is accomplished by contact of the surface of the membrane sheet with a heated surface.

3. The method according to claim 2, wherein pressure is also applied by the heated surface to the membrane sheet, said pressure causing at least partly the pressure difference over the filter layer.

4. The method according to claim 3, wherein liquid is drained from the membrane sheet through the filter layer by the effect of reduced pressure while pressure is being applied by the heated surface to the membrane sheet, said reduced pressure and the pressure applied by the heated surface causing together the pressure difference over the filter layer.

5. The method according to claim 4, wherein the membrane sheet is dried to a freestanding membrane in a sheet mold where the nanofibrillar cellulose dispersion was supplied.

6. The method according to claim 3, wherein liquid is drained from the membrane sheet through the filter layer to at least one adsorbent sheet while pressure is being applied by the heated surface to the membrane sheet, said pressure applied by the heated surface causing the pressure difference over the filter layer.

7. The method according to claim 6, wherein the membrane sheet is removed together with the filter layer from a sheet mold where the nanofibrillar cellulose dispersion was supplied and placed in a press where the membrane sheet is dried to a freestanding membrane.

8. The method according to claim 6, wherein the nanofibrillar cellulose dispersion is supplied to a moving filter layer as a continuous layer and a continuous membrane is produced by carrying the continuous layer by the moving filter layer through different processing steps, whereafter the membrane is separated from the filter layer.

9. The method according to claim 1, wherein heat applied on the opposite side of the membrane sheet is accomplished by contact of a heated surface with a layer interposed between the heated surface and the membrane sheet.

10. The method according to claim 9, wherein pressure is also applied by the heated surface to the membrane sheet, said pressure causing at least partly the pressure difference over the filter layer.

11. The method according to claim 1, wherein liquid is drained from the membrane sheet through the filter layer by the effect of reduced pressure, while heat applied on the opposite side of the membrane sheet to the membrane sheet is accomplished by radiation heat to the membrane sheet, said reduced pressure causing the pressure difference over the filter layer.

12. The method according to claim 11, wherein the membrane sheet is dried to a freestanding membrane in a sheet mold where the nanofibrillar cellulose dispersion was supplied.

13. The method according to claim 1, wherein a first nanofibrillar cellulose dispersion is first supplied on the filter layer and liquid is drained from it to form a nanofibrillar network, whereafter a second nanofibrillar cellulose dispersion where the size of the fibrils is smaller than the size of the fibrils of the first nanofibrillar cellulose dispersion is supplied on said nanofibrillar network and liquid is drained through said nanofibrillar network and the filter layer from the second nanofibrillar cellulose dispersion.

14. The method according to claim 13, wherein the fibrils of the second nanofibrillar dispersion are of such size that they are capable of penetrating through the filter layer if the second nanofibrillar dispersion is supplied directly to the filter layer.

15. The method according to claim 1, wherein the cellulose of the nanofibrillar cellulose dispersion includes anionically charged groups, the nanofibrillar cellulose dispersion being pretreated by lowering its pH, whereafter the pretreated nanofibrillar cellulose dispersion is supplied at the lowered pH on the filter layer.

16. The method according to claim 1, wherein the nanofibrillar cellulose dispersion is supplied to the filter layer at a concentration of 0.1-10.0%.

17. The method according to claim 1, wherein the temperature of the membrane sheet is kept under 100° C. by the heat applied to the membrane sheet.

18. The method according to claim 1, wherein the liquid is drained from the membrane sheet by the effect of reduced pressure to opposite directions through both surfaces of the membrane sheet.

19. The method according to claim 18, wherein heat and pressure are applied to opposite sides of the membrane sheet.

20. The method of claim 1, wherein the fibrils of the nanofibrillar cellulose are the main constituent of the membrane.

21. The method of claim 1, wherein the nanofibrillar cellulose is chemically modified cellulose containing anionically charged groups.

22. The method according to claim 1, wherein the acts of draining liquid and applying heat are performed for less than ten minutes.

23. The method of claim 1, further comprising filtering the nanofibrillar cellulose dispersion through a nonwoven sheet or paper, the nonwoven sheet or paper remaining as a structural part, of the formed membrane sheet.

24. The method of claim 1, wherein the thickness of the membrane is in the range of 5-50 µm.

25. The method of claim 1, wherein the nanofibrillar cellulose comprises fibrils having a length exceeding one micrometer and a number-average diameter below 200 nm.

26. The method of claim 1, wherein the nanofibrillar cellulose comprises fibrils having a diameter of 50 nm or less.

27. A method of forming a fibril cellulose membrane laminate, the method comprising:
   supplying a nanofibrillar cellulose dispersion on a filter layer;
   draining liquid from the nanofibrillar cellulose dispersion by the effect of reduced pressure through the filter layer that is impermeable to fibrils of the nanofibrillar cellulose but permeable to the liquid to form a membrane sheet on the filter layer;
   continuing draining the liquid from the nanofibrillar cellulose while applying heat to a side of the membrane sheet opposite the filter layer by contact of a heated surface with a layer interposed between the heated surface and the membrane sheet to promote the removal of the liquid in liquid state while continuing draining of the liquid through the filter layer by pressure difference over the filter layer, the layer interposed between the heated surface and the membrane sheet being a filter fabric or a structural layer;
   subsequent to the heat application, removing the membrane sheet from the filter layer as the nanofibrillar cellulose membrane, the nanofibrillar cellulose membrane being freestanding.

28. A method of forming a fibril cellulose membrane laminate, the method comprising:
   supplying a nanofibrillar cellulose dispersion on a filter layer;
   draining liquid from the nanofibrillar cellulose dispersion by the effect of reduced pressure through the filter layer that is impermeable to fibrils of the nanofibrillar cellulose but permeable to the liquid to form a membrane sheet on the filter layer;
   continuing draining the liquid from the nanofibrillar cellulose while applying heat to a side of the membrane sheet opposite the filter layer to promote the removal of the liquid in liquid state while continuing draining of the liquid through the filter layer by pressure difference over the filter layer;

subsequent to the heat application, removing the membrane sheet from the filter layer as the nanofibrillar cellulose membrane, the nanofibrillar cellulose membrane being freestanding; and laminating a structural material to the membrane sheet, the structural material including plastic films, cardboard, or paper.

29. The method of claim 28, wherein the structural material is laminated to the membrane sheet by interposing the structural material layer between a heated surface and the membrane sheet and applying pressure for dewatering.

* * * * *